United States Patent [19]
Suzuki et al.

[11] 3,948,717

[45] Apr. 6, 1976

[54] TIRE BUILDING DRUM

[75] Inventors: Masayoshi Suzuki, Kodaira; Kazuo Ozaki, Higashiyamato, both of Japan

[73] Assignee: Bridgestone Tire Company Limited, Tokyo, Japan

[22] Filed: Apr. 14, 1975

[21] Appl. No.: 568,053

[30] Foreign Application Priority Data
Apr. 15, 1974 Japan............................ 49-42637

[52] U.S. Cl. ................ 156/415; 156/132; 156/417; 156/419
[51] Int. Cl.².................... B29H 17/14; B29H 17/22
[58] Field of Search .......... 156/414, 415, 416, 417, 156/418, 419, 420, 132, 133, 401

[56] References Cited
UNITED STATES PATENTS

| | | | |
|---|---|---|---|
| 3,160,545 | 12/1964 | Burton | 156/415 |
| 3,237,199 | 2/1966 | Brey | 156/415 |
| 3,244,575 | 4/1966 | Sabo et al. | 156/132 |
| 3,388,024 | 6/1968 | Black et al. | 156/417 |
| 3,405,023 | 10/1968 | Eckenwiler et al. | 156/415 |
| 3,547,733 | 12/1970 | Leblond | 156/415 |
| 3,598,673 | 8/1971 | Caretta | 156/132 |
| 3,645,826 | 2/1972 | Henley et al. | 156/416 |

*Primary Examiner*—William A. Powell
*Assistant Examiner*—John E. Kittle
*Attorney, Agent, or Firm*—Haseltine, Lake & Waters

[57] ABSTRACT

A tire building drum is adapted to be expansible and collapsible at three different diameter states and includes a main tire building drum, a pair of auxiliary tire building drums partially engageable with the radially inner surfaces of the opposite end portions of the main tire building drum to axially be slidable toward and away from the equatorial plane of the main tire building drum, a rotary shaft carrying thereon the main and auxiliary tire building drums for rotation thereof, and a pair of slide means for axially sliding the auxiliary tire building drums toward and away from the equatorial plane of the main tire building drum.

12 Claims, 5 Drawing Figures

TIRE BUILDING DRUM

The present invention relates to a tire building drum, and in particular to an improved tire building drum which is adapted to be expansible and collapsible in a radial direction to be maintained in three different diameter states as well as extensible and contractable in an axial direction.

In general, rubberized fabric cord plies are wider in width than the tire building drum when the plies are placed and applied on the tire building drum for its building. For this reason, it is required that the both end portions of the plies be supported by any other means while being under a stitching operation on the tire building drum not only to completely evacuate air entrapped between them but to improve the adhesion between them. In an attempt to support the both end portions of the plies, there have heretofore been proposed various tire building drums in each of which a pair of supporting rings or mechanisms are rotatably mounted adjacent opposite ends of the tire building drum for supporting the both end portions of the plies. The rings or mechanisms are, however, not adapted to be rotated by a rotary shaft which imparts rotary motion to the tire building drum but are rotated by rotation of the tire building drum through the plies on the tire building drum so that many wrinkles are brought about on the plies due to distortion occurred between the tire building drum and the rings or mechanisms while the stitching operation is being carried out. On the other hand, various conventional tire building drums have been adapted to be expansible and collapsible in two different diameter states, viz., constructed to expand from a collapsed state to an expanded state and to collapse vice versa. When the drum is in the collapsed state, application of the plies on the drum and removal of the build tire from the drum are performed. When the drum is in the expanded state, final building of the plies is performed. The tire building drum of this type usually has a great drum height. As a result of this, the fabric cords of the plies around the beads are extremely shifted and deviated upon turning over of the plies so that poor structural characteristics are brought about in the finished tire, causing a poor quality of the tire especially in its strength and balance at a high speed running.

It is therefore an object of the present invention to eliminate such drawbacks inherent in the prior art tire building drums and to provide a tire building drum for building the plies to obtain a finished tire with a high quality.

It is another object of the present invention to provide a tire building drum adapted to be collapsible and expansible in three different diameter states and having a pair of auxiliary tire building drums for holding the opposite end portion of the plies disposed at the opposite sides of a main tire building drum to be rotatable with the main tire building drum and slidable toward the equatorial plane of the main tire building drum.

In accordance with the present invention, there will be provided to accomplish such the objects a tire building drum which comprises a main tire building drum including a plurality of first main arcuate segments circumferentially spaced apart from each other and a plurality of second main arcuate segments each of which is interposed between the first arcuate segments to define the main tire building drum in the form of a cylindrical shape with the first main arcuate segments for holding a circumferential central portion of a composite annular tire member, a pair of auxiliary tire building drum partially engageable with the radially inner surfaces of the opposite end portions of the main tire building drum to axially be slidable toward and away from the equatorial plane of the main tire building drum, each auxiliary tire building drum including a plurality of first auxiliary arcuate segments disposed opposingly to the first main arcuate segments and a plurality of second auxiliary arcuate segments disposed opposingly to the second main arcuate segments to define the auxiliary tire building drum in the form of a cylindrical shape with the first auxiliary segments for holding axial opposite end portions of the composite annular tire member, a rotary shaft coaxially provided within the main and auxiliary tire building drums for rotation of the main and auxiliary tire building drums, first diameter control means for expanding and collapsing the first main and auxiliary arcuate segments between a collapsed state and an ultimately expanded state through a partially expanded state, second diameter control means for expanding and collapsing the second main and auxiliary arcuate segments between the collapsed state and the ultimately expanded state, and a pair of slide means for axially sliding the auxiliary tire building drums toward and away from the equatorial plane of the main tire building drum.

A tire building drum may comprise a main hub member having a circular plate portion and axial annular side extensions extending from the opposite sides of the plate portion, the main hub member being formed with an axial bore fitted with the rotary shaft to be rotated with the rotary shaft, and a pair of auxiliary hub member each of which has an axial bore axially slidably engaged with the respective extension of the main hub member and to be rotatable with the respective extension of the main hub members, and in which the first and second main arcuate segments of the main tire building drum are radially movably supported by the circular plate portion of the main hub member and the first and second auxiliary arcuate segments of each of the auxiliary tire building drum are radially movably supported by each of the extensions of the auxiliary hub member so that the auxiliary tire building drums are axially movable toward and away from the equatorial plane of the main tire building drum.

On the other hand, the first diameter control means may include a plurality of main double-acting actuators circumferentially equiangularly assembled in the circular plate portion of the main hub member for radially moving the first main arcuate segments toward and away from the rotary shaft to be maintained between said collapsed state and the ultimately expanded state through the partially expanded state, and a plurality of auxiliary double-acting actuator circumferentially equiangularly assembled in each of the auxiliary hub members for radially moving the first auxiliary arcuate segments toward and away from the rotary shaft to be maintained between the collapsed state and the ultimately expanded state through the partially expanded state, and the second diameter control means may include a plurality of main single-acting actuators each of which is assembled in the circular plate portion of the main hub member to be disposed between the main double-acting actuators for radially moving the second main arcuate segments toward and away from the rotary shaft to be maintained between the collapsed state and the ultimately expanded state, and a plurality of auxiliary single-acting actuators each of which is assembled in each of the auxiliary hub members to be disposed between the auxiliary double-acting actuators for radially moving the second auxiliary arcuate segments toward and away from the rotary shaft to be maintained between the collapsed state and the ultimately expanded state.

The slide means may comprise an annular cylinder formed between the rotary shaft and the side extension of the main hub member to extend along the rotary shaft and having a pair of ports formed at its opposite ends connected to a fluid pressure source, an annular piston accommodated in the annular cyclinder slidably along the rotary shaft, an annular piston rod having one end connected to the annular piston and an extension extending from the auxiliary hub member in parallel with the annular piston rod and having the remotest end connected to the other end of the piston rod so that each of the auxiliary hub members is caused to move toward and away from the main hub member for moving each of the auxiliary tire building drum toward and away from the equatorial plane of the main tire building drum when the annular piston is actuated by alternatively introducing a fluid under pressure from the ports of said annular cylinder.

The features and advantages of the tire building drum according to the present invention will become more apparent from the following description taken in conjunction with the accompanying drawings, in which.

Figure 1:
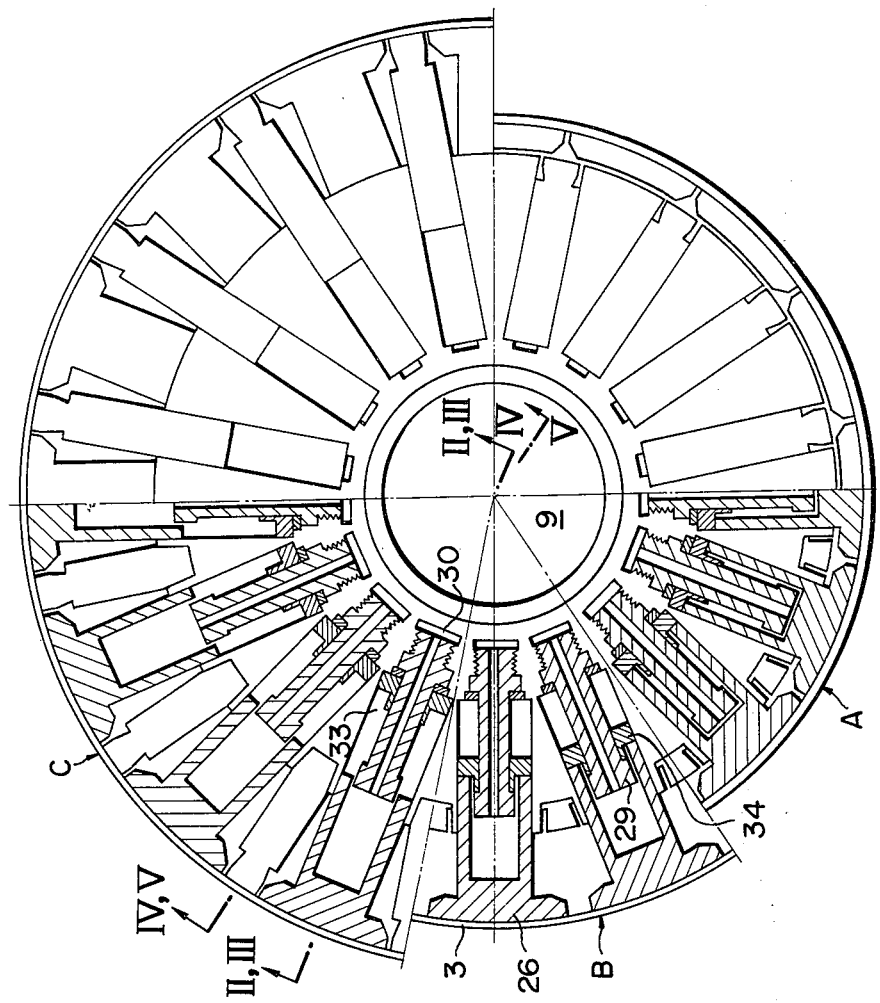
FIG. 1 is a side elevational view, partly in section, of a preferred embodiment of the tire building drum according to the present invention, illustrating an ultimately expanded state at its upper half and a partially expanded state and a collapsed state at its lower half.

Referring now to FIGS. 1 to 5, the tire building drum in accordance with the present invention comprises a main tire building drum, shown generally at 1 and a pair of auxiliary tire building drums, shown generally at 2 and 2'. The main tire building drum 1 includes a plurality of first main arcuate segments 3 circumferential spaced apart from each other and a plurality of second main arcuate segments 4 each of which is interposed between the first arcuate segments 3 to define the main tire building drum 1 in the form of a cylindrical shape with the first main arcuate segments 3 for holding a circumferentially central portion of a composite annular tire member, not shown. The composite tire member generally includes one or more composite annular tire carcasses with fabric cords, beads and chafer strip and an annular tread consisting of a breaker strip or a cincture belt. A horizontal rotary shaft 5 is rotatably supported in a cantilever fashion by a frame structure, not shown, and carries thereon a main hub member, generally shown at 6. The main hub member 6 comprises a circular plate portion 7 and a pair of annular side extensions 8 and 8' extending from the opposite sides of the plate portion 7 while being formed with an axial bore 9 fitted with the rotary shaft 5. The main hub member 6 is keyed or otherwise secured as at 10 and 10' to the rotary shaft 5 for rotation therewith. A pair of auxiliary hub members 11 and 11' have respective axial bores 11a and 11a' engaged with the side extensions 8 and 8' of the main hub member 6 and are connected to the side extensions 8 and 8' by means of keys 12 and 12' which are received in elongate key way grooves 13 and 13' formed on the peripheries of the sides extensions 8 and 8' to extend in parallel with the rotary shaft 5 so that the auxiliary hub members 11 and 11' are not only movable toward and away from the plate portion 7 of the main hub member 6 but also rotatable together with the main hub member 6 upon rotation of the rotary shaft 5. A pair of annular recesses 14 and 14' are formed on the inner peripheries of the side extensions 8 and 8', respectively, to provide annular cylinder 15 and 15' between the side extensions 8, 8' and the rotary shaft 5 having ports 16a, 16b and 16a', 16b' formed at their opposite ends. A pair of annular pistons 17 and 17' are accommodated in the annular cylinders 15 and 15', respectively, slidably along the rotary shaft 5 and connected to annular piston rods 18 and 18', respectively, at their one ends. A pair or tubular adjusting screw members 19 and 19' have respective outer surfaces 19a and 19a' each of which is formed with a thread being in threaded engagement with each of the inner surfaces of the side extensions 20 and 20' extending outwardly of the auxiliary hub members 11 and 11' and respective inner surfaces 19b and 19b' each of which is formed with a thread, cut opposingly to the aforementioned thread, being in threaded engagement with each of the outer surfaces of the annular piston rods 18 and 18' so that rotation of the adjusting screw members 19 and 19' causes the auxiliary hub members 11 and 11' to move toward and away from the plate portion 7 of the main hub member 6 and thus to adjust the axial width between the plate portion 7 of the main hub member 6 and auxiliary hub members 11 and 11'. When a fluid under pressure is introduced into the annular cylinders 15 and 15' alternately through the ports 16a, 16b and 16a', 16b' to actuate the annular piston 17 and 17', the annular piston rods 18 and 18' are caused to project and retract so that the auxiliary hub member 11 and 11' are moved toward and away from the plate portion 7 of the main hub member 6 by way of the adjusting screw members 19 and 19'. The flapper rings 21 and 21' are rigidly connected to the outer ends of the adjusting screw members 19 and 19', respectively, to form semi-circular slits 22 and 22' extending toward the axial lines of the adjusting screw members 19 and 19' which are held in threaded engagement with the flapper rings 21 and 21' by means of respective adjusting screws 23 and 23' to lock the adjusting screw members 19, 19' and the annular piston rods 18, 18'. The connection between the piston rods 18, 18' and the side extensions 20, 20' is thus in no way loosened by means of the flapper rings 21, 21' and the adjusting screws 23, 23' while the rotary shaft 5 is under rotation.

The plate portion 7 of the main hub member 6 has therein a plurality of first main cylinders 24 which are circumferentially equiangularly disposed to radially extend toward the first main arcuate segment 3 and a pair of pluralities of second main cylinders 25 and 25' which are circumferentially interposed between the first main cylinders 24 to radially extend toward the second main arcuate segments 4.

Figure 2:
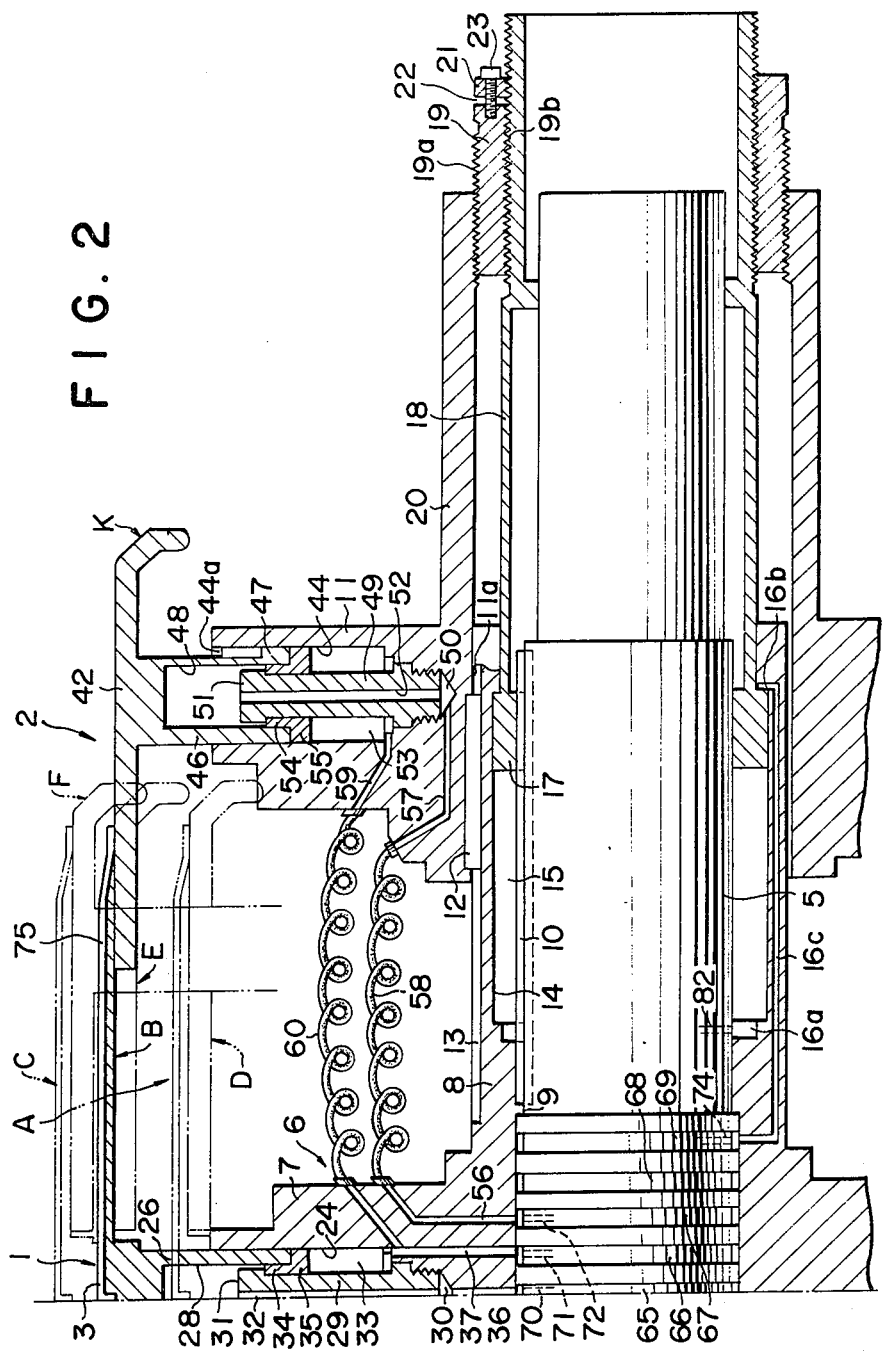
FIG. 2 is a cross sectional view of the right half of the embodiment illustrated in FIG. 1 as viewed from a position indicated by lines II—II in FIG. 1.
Figure 3:
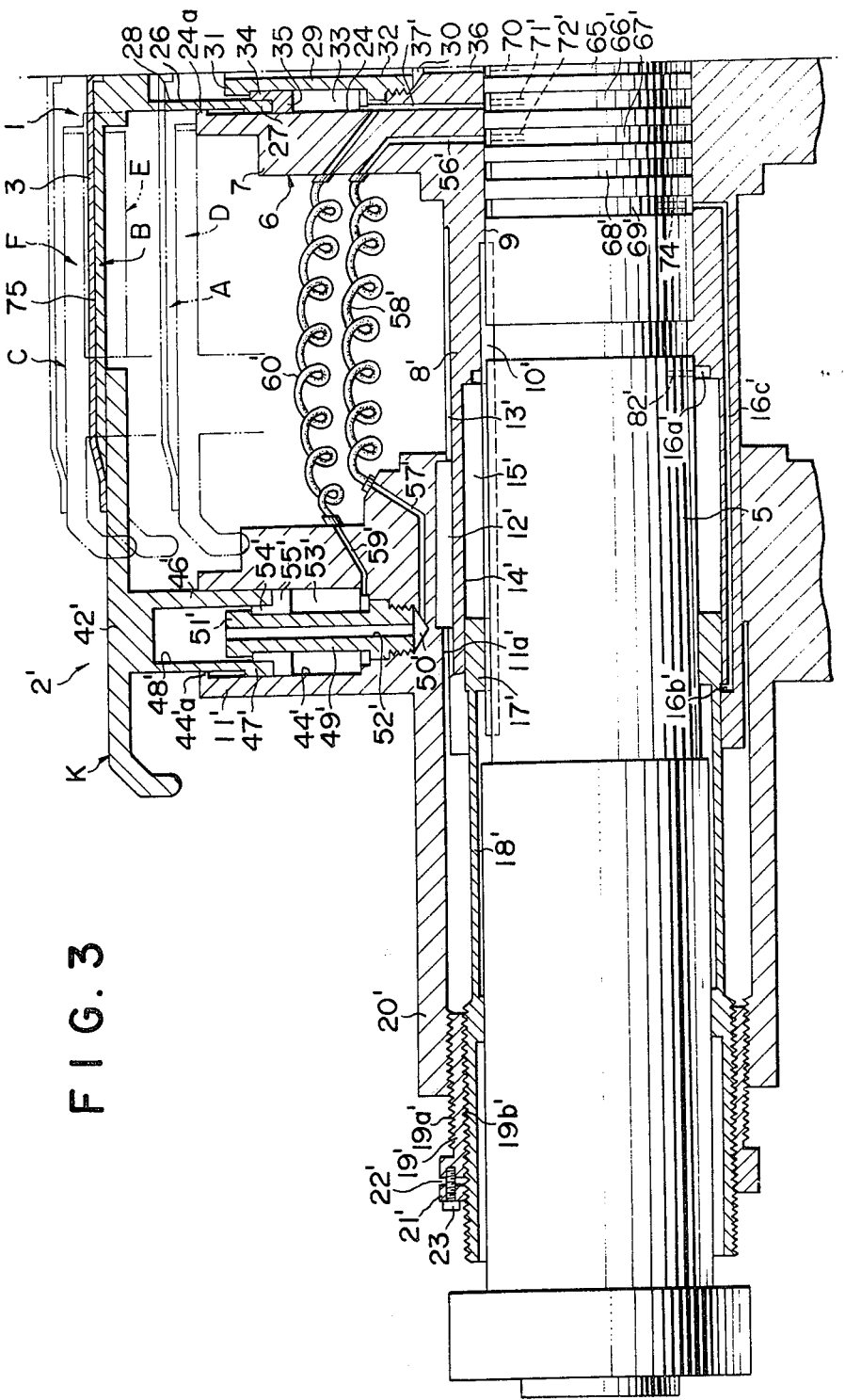
FIG. 3 is a cross sectional view of the left half of the embodiment illustrated in FIG. 1 as viewed from a position indicated by lines III—III in FIG. 1.

Each of the first main cylinders 24 is opened at its radially outer end which has an inner projection 24a projected inwardly as shown in FIGS. 2 and 3. Each first main secure piston 26 is radially slidably accommodate in each of the first main cylinders 24 and has a radially outer end connected to the inner periphery of the first main arcuate segment 3 and a radially inner end with an outwardly projected projection 27 to be engageable with the inner projection 24a of the first main cylinder 24. The first main secure piston 26 is formed with a recess 28 which extends from the radially inner end toward the first main arcuate segment 3 and is opened at the radially inner end. Each tubular fluid passage member 29 has a radially inner end connected to the radially inner portion of the first main cylinder 24 to define a radially inner confined chamber 30 and a radially outer end with an outwardly projected annular projection 31 to be accommodated in the recess 28 of the first main secure piston 26. The fluid passage member 29 has therein a radial bore 32 which is adapted to connect the recess 28 of the first main secure piston 26 and the radially inner chamber 30. The outer diameter of the fluid passage member 29 is smaller than the inner diameter of the first main cylinder 24 to define an annular chamber 33 in which an annular free piston 34 is radially slidably accommodated. The free piston 34 has a radially outer end to be engageable with the radially inner surface of the projection 31 of the fluid passage member 29 and a radially inner end with an outwardly projected annular projection 35 to slidably be engaged with the inner wall of the annular chamber 33. The radially inner chamber 30 is connected with the first fluid pressure passage 36 formed in the plate portion 7 of the main hub member 6, while the annular chamber 33 is connected with the second fluid pressure passages 37 and 37' formed also in the plate portion 7 of the main hub member 6. When a fluid under pressure is initially introduced into the annular chamber 33 through the second fluid pressure passages 37 and 37', the first main secure piston 26 is caused to move radially outwardly until the radial outer end of the free piston 34 is engaged with the radially inner surface of the projection 31 of the fluid passage member 29 to expand the first main arcuate segment 3 to the partially expanded state, generally shown at B from the collapsed state, generally shown at A. When the fluid under pressure is thereafter introduced into the radially inner chamber 30 through the first fluid pressure passage 36 and permitted to enter the recess 28 of the first main secure piston 26 through the radial bore 32 of the fluid passage member 29, the first main secure piston 26 is caused to radially outwardly move until the outer projection 27 of the first main secure piston 26 is engaged with the inner projection 24a of the first main cylinder 24 to expand the first main arcuate segment 3 to the ultimately or fully expanded state, generally shown at C from the partially expanded state B. When the fluid under pressure is then simultaneously exhausted from the radially inner chamber 30 and the annular chamber 33 through the first and second fluid pressure passages 36 and 37, 37' the first main arcuate segment 3 is caused to radially inwardly move to the collapsed state A from the ultimately expanded state C through the partially expanded state B. The conbination of the first main cylinder 24, the first main secure piston 26, the fluid passage member 29 and the free piston 34 constitute, as a whole, a double-acting actuator which is actuated to cause the first main arcuate segement 3 to radially move between the collapsed state A and the ultimately expanded state C through the partially expanded state B. The first main arcuate segment 3 may be double-actingly actuated by another double-acting actuator in place of the foregoing double-acting actuator where desired.

Figure 4:
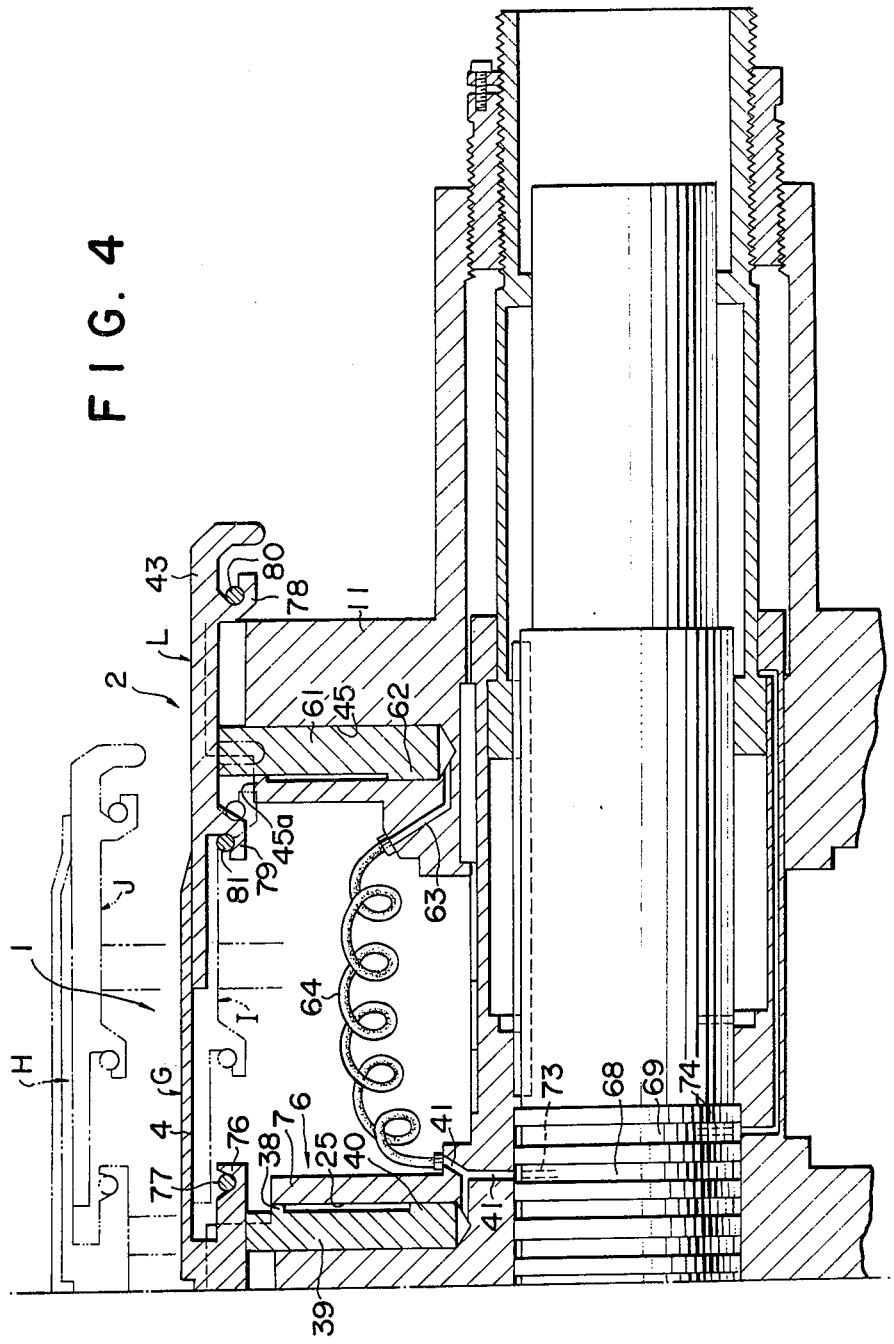
FIG. 4 is a cross sectional view of the right half of the embodiment illustrated in FIG. 1 as viewed from a position indicated by lines IV—IV in FIG. 1.

The second main cylinders 25 and 25' are symmetrically disposed to the equatorial plane of the main tire building drum 1 and their constructions are substantially identical to each other so that there will not be explained hereinafter about all the parts in the cylinders 25' corresponding to the parts in the cylinders 25 which are, however, shown with a prime. Each of the second main cylinders 25 is opened at its radially outer end which has an inner projection 38 projected inwardly as shown in FIG. 4. Each second main secure piston 39 is radially slidably accommodated in each of the second main cylinders 25 and has a radially outer end connected to the inner periphery of the second main arcuate segment 4 and a radially inner end with an outwardly projected projection 40 to be engageable with inner projection 38 of the second main cylinder 25. The second main cylinder 25 is connected at its radially inner end with the fourth fluid pressure passage 41 formed in the plate portion 7 of the main hub member 6. When the fluid under pressure is introduced into the second main cylinder 25 through the fourth fluid pressure passage 41, the second main secure piston 39 is caused to move radially outwardly until the outer projection 40 of the second main secure piston 39 is engaged with the inner projection 38 of the second main cylinder 25 to expand the second main arcuate segment 4 to the ultimately or fully expanded state H from the collapsed state G. When the fluid under pressure is exhausted from the second main cylinder 25 through the fourth fluid pressure passage 41, the second main secure piston 39 is in turn caused to move radially inwardly to collapse the second main arcuate segment 4 to the collapsed state G from the ultimately expanded state H. The conbination of the second main cylinder 25 and the second main secure piston 39 constitute, as a whole, a single-acting actuator which is actuated to cause the second main arcuate segment 4 to radially move between the collapsed state G and the ultimately expanded state H. The second main arcuate segment 4 may be single-actingly actuated by another single-acting actuator in place of the foregoing single-acting actuator if desired.

The auxiliary tire building drum 2 includes a plurality of first auxiliary arcuate segments 42 circumferentially spaced apart from each other and disposed opposingly to the first main arcuate segments 3 of the main tire building drum 1 and a plurality of second auxiliary arcuate segment 43 which are interposed between the first auxiliary arcuate segments 42 and opposingly disposed to the second main arcuate segments 4 of the main tire building drum 1 to define the auxiliary tire building drum 2 in the form of a cylindrical shape with the first auxiliary arcuate segments 42 for holding one circumferential end portion of the composite annular tire member.

The construction in the auxiliary tire building drum 2' for holding the other circumferential end portion of the composite annular tire member is substantially identical to that in the auxiliary tire building drum 2 so that there will not be explained hereinafter about all the parts in the auxiliary tire building drum 2' corresponding to the parts in the main tire building drum 2 which are, however, shown with a prime. The auxiliary hub member 11 has therein a plurality of the first auxiliary cylinders 44 which are circumferentially equiangularly disposed to radially extend toward the first auxiliary arcuate segments 42 as shown in FIG. 2 and a plurality of second auxiliary cylinders 45 which are circumferentially interposed between the first auxiliary cylinders 44 to radially extend toward the second auxiliary arcuate segments 43 as shown in FIG. 4. Each of the first auxiliary cylinders 44 is opened at its radially outer end which has an inner projection 44a projected inwardly. Each first auxiliary secure piston 46 is radially slidably accommodated in each of the first auxiliary cylinders 44 and has a radially outer end connected to the inner periphery of the first auxiliary arcuate segment 42 and a radially inner end with an outwardly projected projection 47 to be engageable with the inner projection 44a of the first auxiliary cylinder 44. The first auxiliary secure piston 46 is formed with a recess 48 which extends from the radially inner end toward the first auxiliary segment 42 and is opened at the radially inner end. Each tubular fluid passage member 49 has a radially inner end connected to the radially inner portion of the first auxiliary cylinder 44 to define a radially inner confined chamber 50 and a radially outer end with an outwardly projection annular projection 51 to be accommodated in the recess 48 of the first auxiliary secure piston 46. The fluid passage member 49 has therein a radial bore 52 which is adapted to connect the recess 48 of the first auxiliary secure piston 46 and the radially inner chamber 50. The outer diameter of the fluid passage member 49 is smaller than the inner diameter of the first auxiliary cylinder 44 to define an annular chamber 53 in which an annular free piston 54 is radially slidably accommodated. The free piston 54 has a radially outer end to be engageable with the radially inner surface of the projection 51 of the fluid passage member 49 and a radially inner end with an outwardly projected annular projection 55 to slidably be engaged with the inner wall of the annular chamber 53. The radially inner chamber 50 is connected with the third fluid pressure passage 56 formed in the plate portion 7 of the main hub member 6 through a fluid pressure passage 57 formed in the auxiliary hub member 11 and a flexible tube 58 having both ends connected to the third fluid pressure passage 56 and the fluid pressure passage 57. The annular chamber 53 is connected with the second fluid pressure passage 37 formed in the plate portion 7 of the main hub member 6 through a fluid pressure passage 59 formed in the auxiliary hub member 11 and a flexible tube 60 having both ends connected to the second fluid pressure passage 37 and the fluid pressure passage 59. When the fluid under pressure is initially introduced into the annular chamber 53 through the second fluid pressure passage 37, the flexible tube 60 and the fluid pressure passage 59, the first auxiliary secure piston 46 is caused to move radially outwardly until the radial outer end of the free piston 54 is engaged with the radially inner surface of the projection 51 of the fluid passage member 49 to expand the first auxiliary segment 42 to the partially expanded state, generally shown at E from the collapsed state, generally shown at D while the auxiliary hub member 11 is positioned at the close proximity of the plate portion 7 of the main hub member 6. When the fluid under pressure is thereafter introduced into the radially inner chamber 50 through the third fluid pressure passage 56, the flexible tube 58 and the fluid pressure passage 57 and permitted to enter the recess 48 of the first auxiliary secure piston 46 through the radial bore 52 of the fluid passage member 49, the first auxiliary secure piston 46 is caused to radially outwardly move until the outer projection 47 of the first auxiliary secure piston 46 is engaged with the inner projection 46 of the first auxiliary cylinder 44a to expand the first auxiliary arcuate segment 42 to the ultimately or fully expanded state F while the auxiliary hub member 11 is positioned at the close proximity of the plate portion 7 of the main hub member 6. When the fluid under pressure is then simultaneously exhausted from the annular chamber 53 and the radially inner chamber 50 through the fluid passages 59, 57, the flexible tubes 60, 58 and the second and third fluid pressure passages 37, 56, the first auxiliary arcuate segment 42 is caused to radially inwardly move to the collapsed state D from the ultimately expanded state F through the partially expanded state E. The combination of the first auxiliary cylinders 44, the first auxiliary secure piston 46, the fluid passage member 49 and the free piston 54 constitute, as a whole, a double-acting actuator which is actuated to cause the first auxiliary arcuate segment 42 radially move between the collapsed state D and the ultimately expanded state F through the partially expanded state E. The first auxiliary arcuate segment 42 may be double-actingly actuated by another double-acting actuator in place of the foregoing double-acting actuator where desired. Each of the second auxiliary cylinders 45 is opened at its radially outer end which has an inner projection 45a projected inwardly as shown in FIG. 4. Each second auxiliary secure piston 61 is radially slidably accommodated in each of the second auxiliary cylinders 45 and has a radially outer end connected to the inner periphery of the second auxiliary segment 43 and a radially inner end with an outwardly projected projection 62 to be engageable with the inner projection 45a of the second auxiliary cylinder 45. The second auxiliary cylinder 45 is connected at its radially inner end with the fourth fluid pressure passage 41 in the plate portion 7 of the main hub member 6 through a fluid pressure passage 63 formed in the auxiliary hub member 11 and a flexible tube 64 having both ends connected to the fourth fluid pressure passage 41 and the fluid pressure passage 63. When the fluid under pressure is introduced into the second auxiliary cylinder 45 through the fourth fluid pressure passage 41, the flexible tube 64 and the fluid pressure passage 63, the second auxiliary secure piston 61 is caused to move radially outwardly until the outer projection 62 of the second auxiliary secure piston 61 is engaged with the inner projection 45a of the second auxiliary cylinder 45 to expand the second auxiliary arcuate segment 43 to the ultimately or fully expanded state J from the collapsed state I while the auxiliary hub member 11 is positioned at the close proximity of the plate portion 7 of the main hub member 6. When the fluid under pressure is exhausted from the second auxiliary cylinder 45 through the fluid pressure passage 63, the flexible tube 64 and the fourth fluid pressure passage 41, the second auxiliary secure piston 61 is in turn caused to move radially inwardly to collapse the second auxiliary arcuate segment 43 to the collapsed state I from the ultimately expanded state J. The conbination of the second auxiliary cylinder 45 and the second auxiliary secure piston 61 constitute, as a whole, a single-acting actuator which is actuated to cause the second auxiliary arcuate segment 43 to radially move between the collapsed state I and the ultimately expanded state J. The second auxiliary arcuate segment 43 may be single-actingly actuated by another single-acting actuator in place of the foregoing single-acting actuator if desired.

Figure 5:
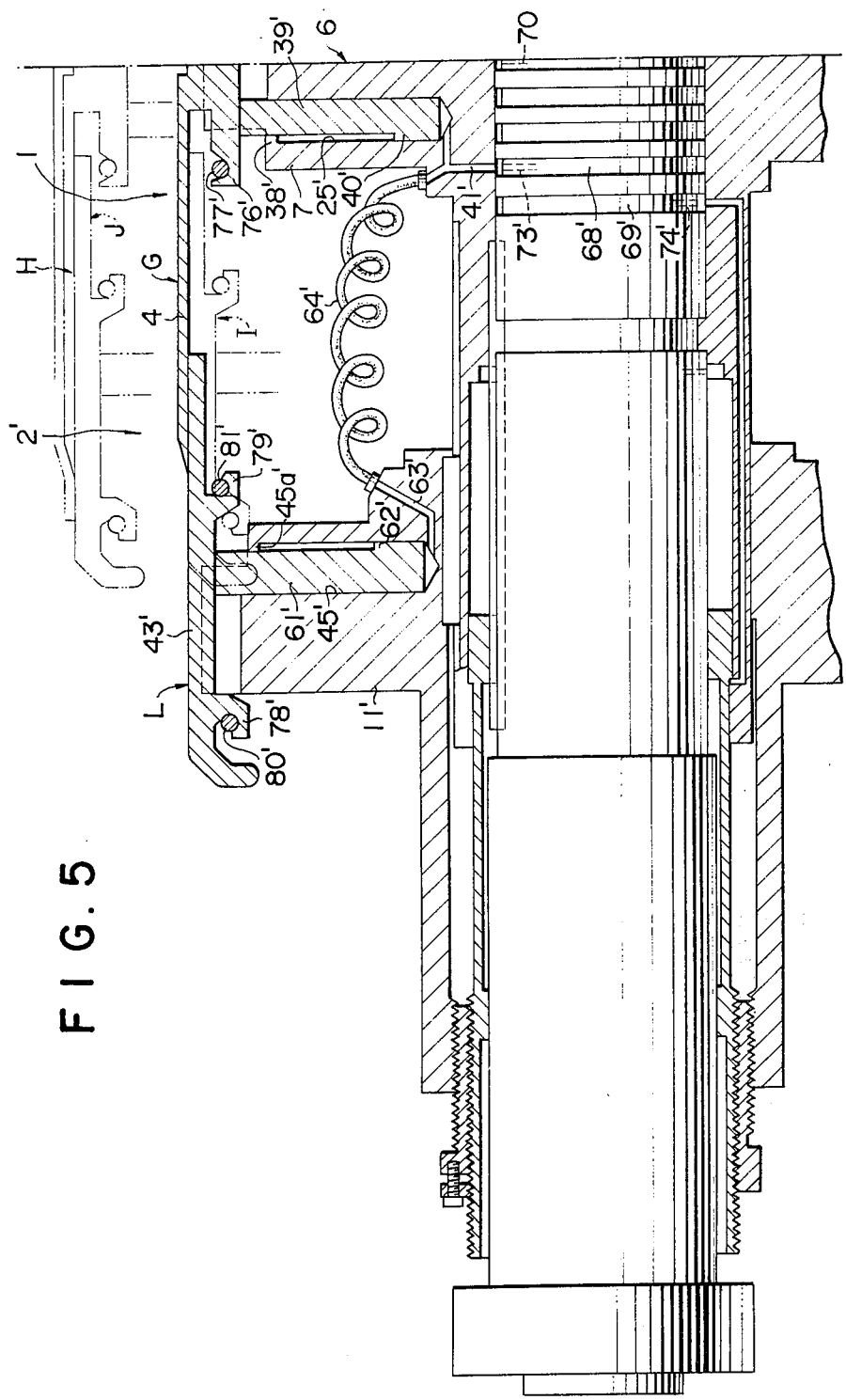
FIG. 5 is a cross sectional view of the left half of the embodiment illustrated in FIG. 1 as viewed from a position indicated by lines V—V in FIG. 1.

The rotary shaft 5 has on its periphery adjecent the plate portion 7 of the main hub member 6 nine grooves 65, 66, 66', 67, 67', 68, 68', 69 and 69' with the annular groove 65 being connected to the first fluid pressure passage 36 the annular grooves 66 and 66' being connected to the second fluid pressure passages 37 and 37' respectively, the annular grooves 67 and 67' being connected to the third fluid pressure passages 56 and 56' respectively, the annular grooves 68 and 68' being connected to the fourth fluid pressure passages 41 and 41' respectively and the annular grooves 69 and 69' being connected to the ports 16b and 16b' through the fluid pressure passages 16c and 16c' respectively. Nine fluid pressure passages 70, 71, 71', 72, 72', 73, 73', 74 and 74' are formed in the rotary shaft 5 having their one ends connected to a suitable change-over valve, not shown, which serves to control the fluid under pressure introduced there through and their other ends connected to the grooves 65, 66, 66', 67, 67', 68, 68', 69 and 69', respectively. An expansible annular diaphragm 75 is placed around the first and second main arcuate segments 3 and 4 of the main tire building drum 1 to radially inwardly urge the main tire building drum 1 toward the rotary shaft 5. A pair of ledges 76 and 76' are formed integral with and below each of the second main arcuate segments 4 and are surrounded by a pair of endless oil springs 77 and 77' respectively, to radially inwardly urge the second main arcuate segments 4 toward the rotary shaft 5 as shown in FIGS. 4 and 5. A pair of ledges 78 and 79 are formed integral with and below each of the second auxiliary arcuate segments 43 and are surrounded by a pair of endless coil springs 80 and 81, respectively, to radially inwardly urge the second auxiliary arcuate segments 43 toward the rotary shaft 5 as shown in FIG. 4. A pair of ledges 78' and 79' are formed integral with and below each of the second auxiliary arcuate segments 43' and are surrounded by a pair of endless coil springs 80' and 81' to radially inwardly urge the second auxiliary arcuate segments 43' toward the rotary shaft 5 as shown in FIG. 5.

The tire building operation of the tire building drum thus constructed and arranged will now be described with current reference to FIGS. 1 to 5.

First stage

When the fluid under pressure is initially introduced into the annular chambers 33 of the main tire building drum 1 through the fluid pressure passages 71, 71' the annular grooves 66, 66', the second fluid pressure passages 37, 37' by operating the change-over valve to radially outwardly move the free pistons 34, the first main secure pistons 26 are caused to move radially outwardly against the annular expansible diaphragm 75 until the radial outer ends of the free pistons 34 are engaged with the radially inner surfaces of the projections 31 of the fluid passage members 29 to expand the first main arcuate segments 3 to the partially expanded state B as shown in FIGS. 1 to 3. The fluid under pressure is simultaneously introduced into the annular chambers 53 and 53' through the flexible tubes 60 and 60' and the fluid pressure passages 59 and 59' to radially outwardly the free pistons 54 and 54', whereupon the first auxiliary secure pistons 46 and 46' are caused to move radially outwardly until the radial outer ends of the free pistons 54 and 54' are engaged with the radially inner surfaces of the projections 51 and 51' of the fluid passage members 49 and 49' to expand the first auxiliary arcuate segments 42 and 42' to the partially expanded state E as shown in FIGS. 2 and 3. In this instance, when the fluid under pressure is introduced into the annular cylinders 15 and 15' through a fluid pressure passages 82 and 82' formed in the rotary shaft 5 and the ports 16a and 16a' while the fluid under pressure is exhausted from the annular cylinders 15 and 15' through the ports 16b and 16b', the annular pistons 17 and 17' are actuated to cause the annular piston rods 18 and 18' to project outwardly so that the auxiliary hub members 11 and 11' are moved away from the plate portion 7 of the main hub member 6 to the remotest positions thereof by the action of the keys 12 and 12'. The first and second auxiliary arcuate segments 42, 42', 43 and 43' are thus caused to move outwardly away from the equatorial plane of the main tire building drum 1, whereupon the first auxiliary arcuate segments 42 and 42' are partially engaged with the radially inner surfaces of the opposite end portions of the first main arcuate segments 3 to assume the partially expanded state K. On the other hand, the second main arcuate segments 4 of the main tire building drum 1 and the second auxiliary arcuate segments 43 and 43' are held in the collapsed states G and L as shown in FIGS. 4 and 5. In this stage, the plies are placed and applied on the main and auxiliary tire building drums 1 and 2, and the stitching operation is thereafter carried out while the drums 1 and 2 are being rotated by the rotary shaft 5. At this time, the opposite end portions of the plies are supported by the first auxiliary arcuate segments 42 and 42' of the auxiliary tire building drums 2 and 2' so that the stitching operation can be reliably performed on the opposite end portions of the plies to preferably evacuate the air entrapped between the plies and to bring about relatively excellent adhesion of the plies. The destortion of the plies occurred in the conventional tire building drum is completely overcome in the above mentioned manner.

Second stage

When the fluid under pressure is then introduced into the radially inner chambers 30 through the fluid pressure passages 70, the annular groove 65 and the first fluid pressure passages 36 by operating the change-over valve and permitted to enter the recesses 28 of the first main secure pistons 26 through the radial bores 32 of the fluid passage members 29, the first main secure pistons 26 are caused to radially outwardly move against the annular expansible diaphragm 75 until the outer projections 27 of the first main secure pistons are engaged with the inner projections 24a of the first main cylinders 24 to expand the first main arcuate segments 3 to the ultimately expanded state C from the partially expanded state B as shown in FIGS. 2 and 3. The second main and auxiliary arcuate segments 4, 43 and 43' are still maintained in the collapsed states G and L as shown in FIGS. 4 and 5, and the first auxiliary arcuate segments 42 and 42' are also still maintained in the partially expanded state K as shown in FIGS. 2 and 3 as the auxiliary hub members 11 and 11' are disposed at the remotest positions from the plate portion 7 of the main hub member 6. In this stage, the plies are stretched at a certain tension so that the remaining air entrapped between the plies at their central portion is completely evacuated.

Third stage

When the fluid under pressure is then introduced into the annular cylinders 15 and 15' through the fluid pressure passages 74 and 74', the annular grooves 69 and 69' the fluid pressure passages 16c and 6c' and the ports 16b and 16b' while the fluid under pressure is exhausted from the annular cylinders 15 and 15' through the ports 16a and 16a', the annular pistons 17 and 17' are actuated to cause the annular piston rods 18 and 18' to retract inwardly so that the auxiliary hub members 11 and 11' are moved toward the plate portion 7 of the main hub member 6 to position at the close proximity of the plate portion 7 of the main hub member 6. The first and second auxiliary arcuate segments 42, 42', 43, and 43' are thus caused to move inwardly toward the equatorial plane of the main tire building drum 1 while the first auxiliary arcuate segments 42 and 42' being maintained disengaged with the radially inner surfaces of the opposite end portions of the first main arcuate segments 3 as shown in FIGS. 2 and 3. When the fluid under pressure is then introduced into the radially inner chambers 50 and 50' through the fluid pressure passages 72 and 72', the annular grooves 67 and 67', the third fluid pressure passages 56 and 56', the flexible tubes 58 and 58' and the fluid pressure passages 57 and 57' by operating the change-over valve and permitted to enter the recessed 48 and 48' of the first auxiliary secure pistons 46 and 46' through the radial bores 52 and 52' of the fluid passage members 49 and 49', the first auxiliary secure pistons 46 and 46' are caused to radially outwardly move until the outer projections 47 and 47' of the first auxiliary secure piston 46 and 46' are engaged with the inner projections 44a and 44a' of the first auxiliary cylinders 44 and 44' to expand the first auxiliary arcuate segments 42 and 42' to the ultimately expanded state F from the partially expanded state E as shown in FIGS. 2 and 3. When the fluid under pressure is then introduced into the second main cylinders 25 and 25' through the fluid pressure passages 73 and 73', the annular grooves 68 and 68' and the fourth fluid pressure passages 41 and 41', the second main secure pistons 39 and 39' are caused to move radially outwardly against the coil springs 77 and 77' until the outer projections 40 and 40' of the second main secure pistons 39 and 39' are engaged with the inner projections 38 and 38' of the second main cylinders 25 and 25' to expand the second main arcuate segments 4 to the ultimately expanded state H from the collapsed state G as shown in FIGS. 4 and 5. The fluid under pressure is simultaneously introduced into the second auxiliary cylinders 45 and 45' through the flexible tubes 64, 64' and the fluid pressure passages 63, 63', the second auxiliary secure pistons 61 and 61' are caused to move radially outwardly against the coil springs 80, 80', 81 and 81' until the outer projections 62 and 62' of the second auxiliary secure pistons 61 and 61' are engaged with the inner projections 45a and 45a' to expand the second auxiliary arcuate segments 43 and 43' to the ultimately expanded state J from the collapsed state I as shown in FIGS. 4 and 5. At this time, the first main arcuate segments 3 are still maintained in the ultimately expanded state C as shown in FIGS. 2 and 3 while the auxiliary hub members 11 and 11' are still maintained at the close proximity of the plate portion 7 of the main hub member 6. In this stage, a pair of beads are set on the plies the end portions of which are then turned over by a pair of suitable side bladders. A breaker and a tread are then applied on the turned over plies. The shift or deviation of the fabric cords as well as the gaps between the fabric cords can be reduced to small amounts when the plies are turned over since the difference between the diameters in the partially expanded state and in the ultimately expanded state can be minimized as compared with the conventional tire building drums which are adapted to be expanded and collapsed in two different diameters. The above advantages may be assured in the tire building drum with a great drum height.

Fourth stage

The fluid under pressure is simultaneously exhaust from the radially inner chambers 30, the annular chambers 33 of the first main cylinders 24, the second main cylinders 25, 25', the radially inner chambers 50, 50', the annular chambers 53, 53' to collapse the first and second main arcuate segments 3, 4 and the first and second auxiliary arcuate segments 42, 42', 43 and 43' by operating the changeover valve to the collapsed states A, G, D and I, respectively. In this state, a finished tire is removed from the building drum.

Fifth stage

The fluid under pressure is introduced into the annular cylinders 15 and 15' through the ports 16a and 16a' and exhausted from the annular cylinders 15 and 15' through the ports 16b and 16b' to move the auxiliary hub members 11 and 11' outwardly to the remotest positions from the plate portion 7 of the main hub member 6.

A single and complete cycle of tire building operation in the tire building drum embodying the present invention has been described above. A number of such operations will be performed through repetition of the cycles.

It should be understood that the shift or deviation of the fabric cords as well as the gaps between the fabric cords can be reduced to small amounts even if the plies are built by a building drum with a great drum height since the plies are expanded from the partially expanded state to the ultimately expanded state so that a finished tire with a high quality especially in the tire strength and balance at a high speed running may be manufactured.

What is claimed is:

1. A tire building drum comprising:
a main tire building drum including a plurality of first main arcuate segments circumferentially spaced apart from each other and a plurality of second main arcuate segments each of which is interposed between said first arcuate segments to define said main tire building drum in the form of a cylindrical shape with said first main arcuate segments for holding a circumferential central portion of a composite annular tire member;
a pair of auxiliary tire building drums partially engageable with the radially inner surfaces of the opposite end portions of said main tire building drum to axially be slidable toward and away from the equatorial plane of said main tire building drum, each auxiliary tire building drum including a plurality of first auxiliary arcuate segments disposed opposingly to said first main arcuate segments and a plurality of second auxiliary arcuate segments disposed opposingly to said second main arcuate segments to define said auxiliary tire building drum in the form of a cylindrical shape with said first auxiliary segments for holding axial opposite end portions of said composite annular tire member;

a rotary shaft carrying thereon said main and auxiliary tire building drums for rotation of said main and auxiliary tire building drums;

first diameter control means for expanding and collapsing said first main and auxiliary arcuate segments between a collapsed state and an ultimately expanded state through a partially expanded state;

second diameter control means for expanding and collapsing said second main and auxiliary arcuate segments between said collapsed state and said ultimately expanded state; and a pair of slide means for axially sliding said auxiliary tire building drums towards and away from the equatorial plane of said main tire building drum.

2. A tire building drum as set forth in claim 1, which further comprises a main hub member having a circular plate portion and axial annular side extensions extending from the opposite sides of said plate portion, said main hub member being formed with an axial bore fitted with said rotary shaft to be rotated with said rotary shaft, and a pair of auxiliary hub member each of which has an axial bore axially slidably engaged with said respective extension of said main hub member and to be rotatable with said respective extension of said main hub member, and in which said first and second main arcuate segments of said main tire building drum are radially movably supported by said circular plate portion of said main hub member and said first and second auxiliary arcuate segments of each of said auxiliary tire building drum are radially movable supported by each of said extensions of said auxiliary hub member so that said auxiliary tire building drums are axially movable toward and away from the equatorial plane of said main tire building drum.

3. A tire building drum as set forth in claim 2, in which said first diameter control means includes a plurality of main double-acting actuators circumferentially equiangularly assembled in said circular plate portion of said main hub member for radially moving said first main arcuate segments toward and away from said rotary shaft to be maintained between said collapsed state and said ultimately expanded state through said partially expanded state, and in a plurality of auxiliary double-acting actuator circumferentially equiangularly assembled in each of said auxiliary hub members for radially moving said first auxiliary arcuate segments toward and away from said rotary shaft to be maintained between said collapsed state and said ultimately expanded state through said partially expanded state; said second diameter control means includes a plurality of main single-acting actuators each of which is assembled in the circular plate portion of said main hub member to be disposed between said main double-acting actuators for radially moving said second main arcuate segments toward and away from said rotary shaft to be maintained between said collapsed state and said ultimately expanded state, and a plurality of auxiliary single-acting actuators each of which is assembled in each of said the auxiliary hub members to be disposed between said auxiliary double-acting actuators for radially moving said second auxiliary arcuate segments toward and away from said rotary shaft to be maintained between said collapsed state and said ultimately expanded state.

4. A tire building drum as set forth in claim 3, in which each of said main double-acting actuators comprises a main fluid-operated cylinder assembly including a cylinder radially extending toward said first main arcuate segment and having an inner projection projected inwardly of said cylinder at its radially outer end, a secure piston radially slidably accommodated in said cylinder and having a radially outer end connected to said inner periphery of said first main arcuate segment and radially inner end with an outwardly projected outer projection to be engageable with said inner projection of said cylinder, said secure piston being formed with a recess radially extending from said radially inner end toward said first main arcuate segment and opened at said radially inner end, a tubular fluid passage member having a radially inner end connected to said radially inner portion of said cylinder to define a radially inner confined chamber connected to a first fluid pressure passage and a radially outer end with an outwardly projected annular projection to be accommodated in said recess of said secure piston, said tubular fluid passage member having therein a radial bore connecting said recess of said secure piston and said radially inner chamber and an outer diameter smaller than the inner diameter of said cylinder to define an annular chamber connected to second fluid pressure passage, and an annular free piston radially slidably accommodated in said annular chamber and having a radially outer end to be engageable with the radially inner surface of said projection of said tubular fluid passage member and a radially inner end with an outwardly projected annular projection to be slidably engaged with said inner wall of said annular chamber so that a fluid under pressure is introduced into said annular chamber through said second fluid pressure passage to radially outwardly move said secure piston until the radially outer end of said free piston is engaged with the radially inner surface of said projection of said tubular fluid passage member to expand said first main arcuate segment to said partially expanded state from said collapsed state and the fluid under pressure is thereafter introduced into said radially inner chamber through said first fluid pressure passage and permitted to enter said recess of said secure piston through said radial bore of said fluid passage member to radially outwardly move said secure piston until said outer projection of said secure piston is engaged with said inner projection of said cylinder to expand said first main arcuate segment to said ultimately expanded state from said partially expanded state.

5. A tire building drum as set forth in claim 3, in which each of said auxiliary double-acting actuator comprises an auxiliary fluid-operated cylinder assembly including a cylinder radially extending toward said first auxiliary arcuate segment and having an inner projection projected inwardly of said cylinder at its radially outer end, a secure piston radially slidably accommodated in said cylinder and having a radially outer end connected to said inner periphery of said first auxiliary arcuate segment and radially inner end with an outwardly projected outer projection to be engageable with said inner projection of said cylinder, said secure piston being formed with a recess radially extending from said radially inner end toward said first auxiliary arcuate segment and opened at said radial inner end, a tubular fluid passage member having a radially inner end connected to said radially inner portion of said cylinder to define a radially inner confined chamber connected to a third fluid pressure passage and a radially outer end with an outwardly projected annular projection to be accommodated in said recess of said secure piston, said tubular passage member having therein a radial bore connecting said recess of said secure piston and said radially inner chamber and an outer diameter smaller than the inner diameter of said cylinder to define an annular chamber connected to a second fluid pressure passage, and an annular free piston radially slidably accommodated in said annular chamber and having a radially outer end to be engageable with the radially inner surface of said projection of said tubular fluid passage member and a radially inner end with an outwardly projected annular projection to be slidably engaged with said inner wall of said annular chamber so that a fluid under pressure is introduced into said annular chamber through said second fluid pressure passage to radially outwardly move said secure piston until the radially outer end of said free piston is engaged with the radially inner surface of said projection of said tubular fluid passage member to expand said first auxiliary arcuate segment to said partially expanded state from said collapsed state and the fluid under pressure is thereafter introduced into said radially inner chamber through said third fluid passage and permitted to enter said recess of said secure piston through said radial bore of said fluid passage member to radially move and secure piston until said outer projection of said secure piston is engaged with said inner projection of said cylinder to expand said first auxiliary arcuate segment to said ultimately expanded state from said partially expanded state.

6. A tire building drum as set forth in claim 3, in which each of said main single-acting actuators comprises at least a main fluid-operated cylinder assembly including a cylinder radially extending toward said second main arcuate segment and having an inner projection projected inwardly of said cylinder at its radially outer end, a secure piston radially slidably accommodated in said cylinder having a radially outer end connection to said inner periphery of said second main arcuate segment and a radially inner end with an outwardly projected outer projection to be engageable with said arcuate projection of said cylinder, said cylinder being connected to a fourth fluid pressure passage so that a fluid under pressure is introduced into said cylinder through said fourth fluid pressure passage to radially outwardly move said secure piston until said outer projection of said secure piston is engaged with said inner projection of said cylinder to expand said second main arcuate segment to said ultimately expanded state from said collapsed state.

7. A tire building drum as set forth in claim 3, in which each of said auxiliary single-acting actuators comprises an auxiliary fluid-operated cylinder assembly including a cylinder radially extending toward said second auxiliary segment and having an inner projection projected inwardly of said cylinder at its radially outer end, a secure piston radially slidably accommodated in said cylinder having a radially outer end connected to said inner periphery of said second auxiliary segment and a radially inner end with an outwardly projected outer projection to be engageable with said arcuate projection of said cylinder, said cylinder being connected to a fourth fluid pressure passage so that a fluid under pressure is introduced into said cylinder through said fourth fluid pressure passage to radially outwardly move said secure piston until said outer projection of said secure piston is engaged with said inner projection of said cylinder to expand said second auxiliary arcuate segment to said ultimate expanded state from said collapsed state.

8. A tire building drum as set forth in claim 2, in which each of said slide means comprises an annular cylinder formed between said rotary shaft and said side extension of said main hub member to extend along said rotary shaft and having a pair of ports formed at its opposite ends and connected to a fluid pressure source, an annular piston accommodated in said annular cylinder slidably along said rotary shaft, an annular piston rod having one end connected to said annular piston, and an extension extending from said auxiliary hub member in parallel with said annular piston rod and having the remotest end connected to the other end of said piston rod so that each of said auxiliary hub member is caused to move toward and away from said hub member for moving each of said auxiliary tire building drum toward and away from the equatorial plane of said main tire building drum when said annular piston is actuated by alternatively introducing a fluid under pressure into said ports of said annular cylinder.

9. A tire building drum as set forth in claim 8, in which further comprises an tubular adjusting screw member having an outer surface with a thread being in threaded engagement with the inner surface of said extension of said auxiliary hub member and an inner surface with a thread opposite to said thread of said outer surface being in threaded engagement with the outer surface of said annular piston so that the width between said circular plate portion of said main hub member and said auxiliary hub member is caused to be adjustable by rotation of said tubular adjusting screw.

10. A tire building drum as set forth in claim 9, which further comprises a flapper ring connected to the outer end of said each adjusting screw member to form a semi-circular slit extending toward the axial line of the adjusting screw member, and an adjusting screw held in threaded engagement with said adjusting screw member to lock said adjusting screw member and the annular piston rod.

11. A tire building drum as set forth in claim 1, which further comprises an expansible annular diaphragm surrounding and placed on said first and second main arcuate segments of said main tire building drum to radially inwardly urge said main tire building drum toward said rotary shaft.

12. A tire building drum as set forth in claim 1, in which each of said second main arcuate segments having at least a ledge formed integral with and below its radially inner periphery and each of said second auxiliary arcuate segments having at least a ledge formed integral with and below its radially inner periphery, and which further comprising an endless coil spring surrounding and placed on each of said ledges of said second main and auxiliary arcuate segments to radially inwardly urge said second main and auxiliary segments toward said rotary shaft.

* * * * *